United States Patent [19]

Szejtli et al.

[11] Patent Number: 5,425,881
[45] Date of Patent: Jun. 20, 1995

[54] METHOD FOR THE EXTRACTION OF ORGANIC POLLUTANTS FROM CONTAMINATED SOILS

[75] Inventors: Joszef Szejtli; Eva Fenyvesi, both of Budapest, Hungary

[73] Assignee: Wacker-Chemie GmbH, Munich, Germany

[21] Appl. No.: 200,349

[22] Filed: Feb. 23, 1994

[51] Int. Cl.6 ............................................. B09C 1/08
[52] U.S. Cl. ................................. 210/747; 405/128; 405/264; 134/25.1
[58] Field of Search ................. 210/747, 908, 909; 405/128, 263, 264; 134/25.1

[56] References Cited

U.S. PATENT DOCUMENTS

| | | | |
|---|---|---|---|
| 4,401,569 | 8/1983 | Jhaveri et al. | 210/747 |
| 4,443,323 | 4/1984 | Horikoshi et al. | |
| 4,606,774 | 8/1986 | Morris | 210/805 |
| 4,726,905 | 2/1988 | Friedman et al. | 210/909 |
| 4,749,491 | 6/1988 | Lawes et al. | 210/908 |
| 5,017,289 | 5/1991 | Ely et al. | 210/747 |
| 5,018,576 | 5/1991 | Udell et al. | 210/747 |
| 5,039,415 | 8/1991 | Smith | 210/747 |
| 5,061,119 | 10/1991 | Balthaus et al. | 210/747 |
| 5,128,262 | 7/1992 | Lindoerfer et al. | |
| 5,172,709 | 12/1992 | Eckardt et al. | 210/747 |
| 5,190,663 | 3/1993 | Fetzer | 210/909 |

FOREIGN PATENT DOCUMENTS

0016855 10/1980 European Pat. Off. .
0310005 11/1993 European Pat. Off. .

OTHER PUBLICATIONS

J. M. Kustritz, J. C. Preston, D. C. Dobbins: Abstr. Gen. Meet. Am. Chem. Soc. Microbiol. (92 Meet, 352) 1992 "Effects of Co–solvent Additions on General Microbial Activity and Biodegradation of PAH Compounds in Soil form a Wood Treatment Facility" is an English language literature.

Lisa A. Blyshak et al., Anal. Chem. 1988, 60, 2127–2131 "Cyclodextrin-Modified Solvent Extraction for Polynuclear Aromatic Hydrocarbons" is an English language literature.

Iwayama, Y.; Fujeda, S. C.A. 108:101363, 1987, S.N. 1438 "Enteric Formulations of Antimicrobial Phenol Compounds" is an English language reference.

Journal of Chromatographic Science, vol. 28, Jun. 1990, M. Paleologou, pp. 311–317 "Liquid Chromatographic Retention Behaviour and Separation of Chlorophenols on a beta-Cyclodextrin Bonded-Phase Column", Part I. Monoaromatic Chlorophenols: Retention Behaviour is an English language reference.

J. Szemán, L. Szente, T. Szabó, M. Vikmon, Cyclolab Cyclodextin Res. and Dev. Laboratory, Budapest, Hungary, The Sixth International Cyclodextrin Symposium, Chicago '92 "Beta-Cyclodextrin-Methyl Ethers: Structure-Activity Relationship" is an English language reference.

Journal of Chromatography, 516 (1990) 23—31, Elsevier Science Publishers B.V., Amsterdam, Chrom. 22 561, Shigeru Terabe, Yosuke Miyashita and Osamu Shibata "Separation of highly hydrophobic compounds by cyclodextrin-modified micellar electrokinetic chromatography" is an English language reference.

Carbohydrate Polymers 12 (1990) 375–392, J. Szejtli, Cyclolab, Hungary, "The Cyclodextrins and their Applications in Biotechnology" is an English language reference.

Biotechnology Letters vol. 12, No. 6, 447–448 (1990), Raphael Bar & J. Stefan Rokem "Cyclodextrin-Stimulated Fermentation of Prodigiosin by Serratia Marcescens" is an English language reference.

(List continued on next page.)

Primary Examiner—Neil McCarthy
Attorney, Agent, or Firm—Collard and Roe

[57] ABSTRACT

A method for the extraction of organic pollutants from contaminated soils without further contaminating the soil with organic solvents comprises the step of mixing aqueous solutions of cyclodextrins or their derivatives with the contaminated soil.

12 Claims, No Drawings

OTHER PUBLICATIONS

Appl. Microbiol. Biotechnol (1987) 26:522–526, Hidekazu Sawada, Takashi Suzuki, Shi–ichi Akiyama, and Yoshio Nakao, "Stimulatory effect of cyclodextrins on the production of lankacidin-group antibiotics by Streptomyces species" is an English language reference.

Enzyme Microb. Technol., 1989, vol. 11, Jul. pp. 398–403, Paul G. M. Hesselink, Steven van Vliet, Harrie de Vries and Bernard Witholt "Optimization of steroid side chain cleavage by Mycobacterium sp. in the presence of cyclodextrins" is an English language reference.

$\beta$–Cyclodextrin—Methyl Ethers; The Sixth International Cyclodextrin Symposium 1992.

5,425,881

METHOD FOR THE EXTRACTION OF ORGANIC POLLUTANTS FROM CONTAMINATED SOILS

BACKGROUND OF THE INVENTION

1. Field of the Invention

The present invention relates to a method for the extraction of organic pollutants from contaminated soils without further contaminating the soil with organic solvents.

2. The Prior Art

Remediation of soils contaminated with hazardous wastes is one of the most common environmental problems. Plants for the manufacture of fuel from coal and crude oil have contaminated soils with polycyclic aromatic hydrocarbons (PAHs) having toxic, mutagenic and carcinogenic properties. The light hydrocarbons used as solvents by the industry for several decades become deposited in the soil. Wood preserving facilities polluted soils with PAHs and creosote. Beside industrial wastes, soils have been polluted with pesticides and insecticides, many of them poorly degradable and persist in the environment. The reuse of abandoned properties leads to the discovery of contaminants stored separately on secure landfills leaking from underground tanks.

Soil decontamination can be effected through biological treatment, immobilization of contaminants, high pressure cleaning, incineration, microbial oxidation, coagulation, solvent extraction, supercritical fluid extraction, thermal desorption, soil vapor extraction, or other processes. Conventional means for removal of the volatile contaminants include pumping the ground water to the surface followed by air stripping with aboveground equipment, vacuum extraction of volatile subsurface contamination, or site excavation for physical removal of the contaminated soil.

The biodegradation of contaminants at waste sites has been the focus of research recently. It is of lower cost, high effectivity, but time consuming. Months or years may be required to reduce the contamination to the acceptable level. Several techniques are being developed to improve biodegradation rates beyond what can be achieved by simply adding nutrients and water and adjusting soil pH. These approaches entail chemical and biological treatments to increase the bioavailability of pollutants to microorganisms for catabolism, the addition of growth substrates to promote cometabolism of organic contaminants that cannot be degraded otherwise, and the addition of a specially developed mixed bacterial culture to ensure the presence of required types and quantities of the degrading biota.

Research has revealed that the chief factor limiting the rate and extent of biodegradation of pollutants in contaminated soil is the mass transfer.

Organic pollutants are effectively retained by soil particles of large surface areas. Soils with higher organic matter content adsorb more strongly the organic contaminants. The more hydrophobic pollutants show higher affinity for association with the organic matter of the soil. Microbial degradation of adsorbed compounds was shown to be greatly diminished.

A few approaches with the aim to enhance bioremediation of contaminated soils by increasing the bioavailability of contaminants through desorption from the soil are known in the prior art. Desorption is carried out by chemical modifications [e.g., by hydroxylating them with Fenton reagent ($H_2O_2 + Fe^{2+}$)], by surface active agents or solvents.

European Patent No. 310,005, granted to Lindoerfer et al. in 1988, describes a method wherein water soluble biotenside (trehaloselipide, rhamnoselipide) are added to the soil to desorb the hydrocarbons. Surfactant producing organisms added to the soil increase the biodegradation of polychlorinated herbicides and polychlorinated biphenyls.

Since sorption into soil appeared to limit the biomineralization of phenanthrene, it is postulated that mineralization may be enhanced by solubilization of the PAH. Commercially available surfactants at 1% dose were evaluated in biodegradation tests with soil-water systems and appeared to have no beneficial effect on the mineralization of phenanthrene.

Both methanol and ethanol were found to be effective in extracting PAHs from polluted soil, and these solvents are considered biologically compatible. In another study, however, it was found that although addition of methanol and ethanol at concentrations as high as 10% did not adversely affect the level of bioactivity in the subsurface solids, it did significantly reduce the population and, most likely, the diversity of this microbial community. These solvents did not improve the solubility of the PAH compounds present in the soil and actually reduced the rate of biodegradation of these compounds probably due to the reduction in microbe population [J. M. Kustritz, J. C. Preston, D. C. Dobbins: *Abstr. Gen. Meet. Am. Chem. Soc. Microbiol.* (92 Meet, 352) 1992].

Water insoluble solvents (e.g., decalin), as lipophylic mediators, facilitate mass transfer of PAHs and accelerate their biodegradation, according to preliminary laboratory experiments, but optimal PAH degradation rates are achieved only if desorption of PAH from the contaminated soil is performed as a separate unit operation. With this method, a further contaminant (the solvent) is introduced into the soil.

SUMMARY OF THE INVENTION

It is, therefore, an object of the present invention to promote the desorption of the organic pollutants from soil without further contaminating the environment.

It is a further object of the present invention to enhance the biodegradation of the organic pollutants in soils.

The above objects are accomplished according to the present invention by providing a method for the extraction of organic pollutants from contaminated soil comprising the step of mixing an aqueous solution of cyclodextrins or their derivatives with the contaminated soil.

Examples of organic pollutants include hydrocarbons, especially polyaromatic hydrocarbons and their derivatives (e.g., polychlorinated derivatives), phenols and their derivatives (e.g., polychlorinated derivatives), anilines and their derivatives (e.g., polychlorinated derivatives), furanes and their derivatives (e.g., polychlorinated derivatives), dioxines and their derivatives (e.g., polychlorinated derivatives), biphenyls and their derivatives (e.g., polychlorinated derivatives) and organic dyes.

According to the present invention, only aqueous (not organic) solutions of the desorption promoting additives are used. The contaminated soil is spread or mixed with aqueous solutions of cyclodextrins or their derivatives or a mixture of them, supplied with the necessary nutrients, and inoculated with bacterial or fungal culture capable of degrading the organic pollutants. The cyclodextrins or their derivatives are able to desorb the organic pollutants from the soil and keep them in solubilized form (more accessible to the microorganism). Their effect is based on inclusion complex formation. This reversible process ensures constant pollutant concentration in the aqueous phase of the soil slurry.

The present invention is based on the inclusion complex forming ability of cyclodextrins. Most of the organic pollutants in the soil (PAHs, polychlorinated phenols and biphenyls, dioxines, furanes) are proper guests for complex formation with cyclodextrins. The degree of complex formation between host and guest is closely related to the steric fit of the guest inside the cyclodextrin cavity and to the hydrophobicity of the guest. PAHs with 2 or 3 rings fit well into the β-cyclodextrin cavity, while those with more rings (e.g., pyrene, benzo[a]pyrene, benzo[e]pyrene, perylene, benzo[g,h,i]perylene, coronene) prefer γ-cyclodextrin as a host (L. A. Blyshak, T. M. Rossi, G. Patonay, I. M. Warner: Anal. Chem. 60, 2127, 1988). Cyclodextrins are known to extract bitumen from oil sand (K. Horikoshi, I. Shibanai, T. Kato: U.S. Pat. No. 4,443,323, 1984; I. Shibanai, K. Horikoshi, N. Nakamura: European Patent Application 16,855, 1980). The phenol-β-cyclodextrin complex is of very high stability, phenol derivatives as enteric antimicrobial agents (creosote) and as antidiarrheal drugs (guajacol) can be formulated with β-cyclodextrin (CA 108: 101363, 1987). 19 chlorophenols including mono-, di-, tri-, tetra- and penta-substituted derivatives were separated on β-cyclodextrin bonded-phase column (M. Paleologou, S. Li, W. C. Purdy: *J. Chromatogr. Sci.* 28, 311–318 and 319–323, 1990). Pentachlorophenol was effectively solubilized with methyl derivatives of β-cyclodextrin (J. Szeman, L. Szente, T. Szabo, M. Vikmon: "The Sixth International Cyclodextrin Symposium," Chicago, Apr. 21–24, 1992). Chlorinated benzene congeners, polychlorinated biphenyl congeners, tetrachlorodibenzo-p-dioxin isomers and PAHs were successfully separated by cyclodextrin-modified micellar electrokinetic chromatography (CD-MEKC), in which cyclodextrin is added to the micellar solution (S. Terabe, Y. Miyashita, O. Shibata, E. R. Barnhart, L. R. Alexander, D. G. Patterson, B. L. Karger, K. Hosoya, N. Tanaka: *J. Chromatogr.* 516(1), 23–31, 1990).

No application of cyclodextrins in decontamination of soils is known in the prior art.

It was the discovery of the inventors that cyclodextrins or their derivatives enhance the desorption of contaminants from soil as proved by extraction experiments of Examples 1–7. This activity can be utilized for the enhancement of the rate of bioremediation of soils contaminated with organic pollutants.

The method according to the invention can be used for enhancing bioremediation of soils contaminated with organic pollutants by solubilizing the xenobiotic compounds and their polluting degradation products/intermediates and this way increasing the bioavailability of contaminants to microorganisms capable of degrading them.

Application of cyclodextrins in microbiological processes has recently been reviewed (J. Szejtli: *Carbohydr. Polym.* 12 (4), 375–92, 1990). Cyclodextrins may stimulate the growth of microorganisms and the biosynthesis they perform. The effect on the microbial process can be of different origin:

Cyclodextrins may modify the cell membrane permeability [e.g., in case of prodigiosin formation (R. Bar, J. S. Rokem: Biotechn. Letters 12, 447, 1990) and lankacidin fermentation (H. Sawada, T. Suzuki, S. Akiyama, Y. Nakao: *Appl. Microbiol. Biotechnol.* 26, 522, 1987) the disruptive interaction of cyclodextrins with the cell envelope is assumed).

By complexation, cyclodextrins keep away both substrates and products having inhibitory effect (e.g., biotransformation of benzaldehyde and vanillin to alcohols by growing cells of Saccharomyces cerevisiae was faster and greater in an aqueous medium containing either α-cyclodextrin or β-cyclodextrin at the same molar concentration as a substrate. The rate and extent of microbial transformation of higher concentrations of benzaldehyde substrate to L-phenyl acetyl carbinol by immobilized cells of *S. cerevisiae* ATCC 834 was markedly stimulated by the addition of different concentrations of β-cyclodextrin to the fermentation medium. Cyclodextrins were shown to significantly alleviate the inhibitory effects of the aromatic aldehydes in both examples).

By complexation, cyclodextrins stabilize the product(s) from decomposition (e.g., stabilization of nystatin and gluthathion increases their yield of production).

By complexation, cyclodextrins keep away the impurities with inhibitory properties (e.g., production of pertussis toxin is highly enhanced in presence of methylated cyclodextrins partly because of complexation of inhibitory fatty acids).

By complexation, cyclodextrins enhance the solubility of the poorly soluble substrates and with this the accessibility to the biocatalyst (e.g., the addition of cyclodextrins substantially enhanced the conversion of cholesterol, sitosterol and delta-cholestenone to a mixture of androstenedione and androstadienedione by *Mycobacterium sp.* NRRL-B 3683 in a purely aqueous fermentation system (P. G. M. Hesselink, S. Van Vliet, H. DE Vries, B. Witholt: *Enzyme Microb. Technol.* 11 398, 1989). For cholesterol, β-cyclodextrin gave the best results, whereas γ-cyclodextrin was the best clathrate for sitosterol and delta-cholestenone biotransformation. The microbial transformation of 6.α.-fluoro-, 16.α, 17.α-isopropylenedihydrocortexolone into synaflan was improved by β-cyclodextrin in consequence of solubility enhancement.

The facilitated transport of the complexed substrate through the cell wall may be also taken into account.

According to the present invention, beside the desorption promoting effect on the contaminants, cyclodextrins may have a growth-stimulating effect on the microorganisms capable of degrading the contaminants.

In the embodiments of the invention, the soil is moistened with solutions of cyclodextrins and/or cyclodextrin derivatives, or a mixture thereof, and otherwise treated as usual in case of solid phase bioremediation either in land treatment or in prepared bed reactors. In preferred embodiments, cyclodextrins and/or cyclodextrin derivatives, or a mixture thereof, are involved in the single irrigation techniques to control the moisture content and nutrient content and the pH of the solution in composting techniques.

In case of slurry-phase treatment, the rate limiting step is the degree of solubilization of the organic contaminants, as the adequate mixing and aeration conditions are ensured. In the embodiments of the invention, solution of cyclodextrins and/or cyclodextrin derivatives, or a mixture thereof, is used to slurry the soil independently of the treatment system. It can be used in lined lagoons constructed with earth materials at the site or in engineered reactors (e.g., in airlift reactors) or in any other slurry-treatment system.

In the embodiments of the invention, cyclodextrins and/or cyclodextrin derivatives, or a mixture thereof, are dissolved in the nutrient injected into the contaminated zone through wells and trenches in case of in situ subsurface bioremediation techniques.

The type of cyclodextrins and their derivatives or the composition of their mixture used for the enhancement of biodegradation is selected on the basis of site-specific treatability studies. The amount of aqueous solution of cyclodextrins and/or cyclodextrin derivatives, or a mixture thereof, also depends on the type of soil, the type and level of contaminants and the bioremediation technique. The concentration of cyclodextrins and/or cyclodextrin derivatives, or a mixture thereof, in the solution is in the range of 0.1–60% by weight, preferably 1–20% by weight, more preferably 5–10% by weight, based upon the total solution weights.

The cyclodextrin according to the invention can be $\alpha$-, $\beta$- and/or $\gamma$-cyclodextrin derivative, the cyclodextrin derivative is an alkyl, hydroxyalkyl, acyl derivative of $\alpha$-, $\beta$ or $\gamma$-cyclodextrin (e.g., methyl, ethyl, hydroxyethyl, propyl, acetyl, succinyl) or a polymer derivative of them (e.g., cross linked with epichlorohydrin or with isocyanate) or an alkyl, hydroxyalkyl, acyl derivative of these polymers. Cyclodextrin derivatives of higher solubility (alkyl, hydroxyalkyl, acyl derivatives of C1–4 alkyl chain and polymers of 4000–6000 average molecular weight) are preferred, because their inclusion complexes also have high solubility, whereas the complexes of $\alpha$-, $\beta$- and $\gamma$-cyclodextrins are often precipitated. The mixture of any of the above cyclodextrins or cyclodextrin derivatives can be used, preferably a conversion mixture of cyclodextrin production containing $\alpha$-, $\beta$- and $\gamma$-cyclodextrins besides starch.

A major advantage of the present invention is the ability to reduce the level of organic pollutants in the soil. It may be easily applied to any of the bioremediation systems. The fastest removal rates were obtained when the oil-contaminated soil was put into a water-soil slurry and was inoculated with microorganisms and cyclodextrins and/or cyclodextrin derivatives, or a mixture thereof. Improved microorganism contact and effectivity were likely responsible for the rapid rates.

The process is applicable for the separation of the organic contaminants in paint wastes, synthetic rubber processing wastes, coal tar wastes, drilling muds, wood treating wastes, separation sludges, pesticides, insecticide wastes, petroleum refinery oil wastes and creosote contaminated soils.

Other objects and features of the present invention will become apparent from the following detailed description considered in connection with the accompanying Examples, which disclose the embodiments of the present invention. It should be understood, however, that the Examples are designed for the purpose of illustration only and not as a definition of the limits of the invention.

EXAMPLE 1

Extraction of Soil Contaminated with Anthracene

A soil sample from the territory around the laboratories of the inventors was screened (grain size: <0.8 mm) and contaminated with 0.5 mg/g anthracene and extracted with aqueous solutions of some of the following cyclodextrin derivatives, wherein DS equals degree of substitution per glucose unit, and $M_w$ is the weight average molecular weight, measured by gel chromatography on ACA 54 Ultrogel column:

ACDPS ($\alpha$-cyclodextrin polymer) 54% CD content, $M_w=3300$ (CYL-201, Cyclolab, Budapest)

AcACDPS (acetylated $\alpha$-cyclodextrin polymer); $M_w=3500$ (CYL-344/1, Cyclolab, Budapest)

RAMEB (randomly methylated $\beta$-cyclodextrin); D.S.=1.8 (Wacker Chemie GmbH, Munich)

HPBCD (2-hydroxypropyl $\beta$-cyclodextrin); D.S.=2.8 (Chinoin, Budapest)

BCDPS ($\beta$-cyclodextrin polymer) 55% CD content, $M_w=4300$ (CYL-310, Cyclolab, Budapest)

AcBCDPS (acetylated $\beta$-cyclodextrin polymer); $M_w=4700$ (CYL-344/2, Cyclolab, Budapest)

GCD ($\gamma$-cyclodextrin); (Wacker Chemie GmbH, Munich)

AcGCD (acetylated $\gamma$-cyclodextrin); 75% CD content D.S.=6.9 (CYL-349/1, Cyclolab, Budapest)

AcGCD (acetylated $\gamma$-cyclodextrin); 70% CD content D.S.=11.5 (CYL-349/6, Cyclolab, Budapest)

GCDPS ($\gamma$-cyclodextrin polymer) 57% CD content, $M_w=3800$ (CYL-309, Cyclolab, Budapest)

AcGCDPS (acetylated $\gamma$-cyclodextrin polymer); 50% CD content, $M_w=5300$ (CYL-252/4, Cyclolab, Budapest).

One gram soil was stirred magnetically with 10 ml solvent for 15 min at room temperature, then it was left to sediment. The supernatant was measured spectrophotometrically after filtration and the extracted anthracene was expressed in mg/g soil:

| Solvent | Extracted Anthracene (mg/g) |
| --- | --- |
| water | 0 |
| 10% RAMEB | 0.24 |
| 20% RAMEB | 0.36 |
| 20% HPBCD | 0.34 |
| 20% BCDPS | 0.42 |
| 20% GCDPS | 0.26 |
| heptane | 0.37 |

EXAMPLE 2

Extraction of Soil Contaminated with Pyrene

A soil sample of Example 1 contaminated with 50.5 $\mu$g/g pyrene was extracted with aqueous solutions of different cyclodextrin derivatives according to Example 1. The following results were obtained:

| Solvent | Extracted Pyrene ($\mu$g/g) |
| --- | --- |
| water | 0 |
| 10% RAMEB | 27 |
| 20% RAMEB | 44 |
| 20% HPBCD | 33 |
| 20% BCDPS | 31 |
| 10% AcBCDPS | 28 |
| 10% GCDPS | 40 |
| 20% GCDPS | 48 |
| 10% AcGCDPS | 21 |
| heptane | 27 |

EXAMPLE 3

Extraction of Soil Contaminated with Perylene

A soil sample of Example 1 contaminated with 28.4 μg/g perylene was extracted with aqueous solutions of different cyclodextrin derivatives according to Example 1. The following results were obtained:

| Solvent | Extracted Perylene (μg/g) |
| --- | --- |
| water | 0 |
| 20% RAMEB | 6.3 |
| 20% RAMEB* | 9.1 |
| 20% HPBCD | 2.7 |
| 20% BCDPS | 7.1 |
| 20% BCDPS** | 2.3 |
| 20% GCDPS | 4.7 |
| 20% GCDPS*** | 2.1 |
| heptane | 22.5 |

*Extraction for 6 h at room temperature, left to stay for a night
**Extraction for 10 min at +2° C., left to stay for 30 min
***Extraction for 10 min at +40° C., left to stay for 30 min

EXAMPLE 4

Extraction of Soil Contaminated with Polycyclic Aromatic Hydrocarbon (PAH) Mixture 20 g soil sample of Example 1 was contaminated with 10 ml solution containing 3.75 mg/ml PAH mixture dissolved in ethanol of the following composition:

| PAH | mg/ml |
| --- | --- |
| 1-methyl naphthalene | 0.87 |
| fluorene | 1.03 |
| anthracene | 1.00 |
| fluoranthene | 0.31 |
| pyrene | 0.54 |

The dried soil samples were extracted with aqueous solutions of different cyclodextrin derivatives according to Example 1 and the composition of the extracts gained after filtration of the supernatant above the deposited soil left to sediment for 2 h was measured by HPLC (Apparatus: Hewlett-Packard 1050, column: Nucleosil 5 C18 PAH [Macherey-Nagel 150-8-4], mobile phase: acetonitrile-methanol-water 2.25:1.25:1, UV detection at $\lambda=250$ and 300 nm).

The following results were obtained:

EXAMPLE 5

Extraction of Soil Contaminated With Polycyclic Aromatic Hydrocarbon (PAH) Mixture 30 g soil sample of Example 1 was contaminated with 15 ml solution containing 4.56 mg/ml PAH mixture dissolved in tetrahydrofurane of the following composition:

| PAH | mg/ml |
| --- | --- |
| 1-methyl naphthalene | 1.13 |
| fluorene | 1.20 |
| anthracene | 1.10 |
| fluoranthene | 0.29 |
| pyrene | 0.53 |
| perylene | 0.17 |
| Coronene | 0.14 |

EXAMPLE 6

Extraction of Clay Contaminated with Pentachlorophenol (PCP)

A clay dried and screened was contaminated with 0.53 mg/g PCP and extracted with aqueous solutions of different cyclodextrin derivatives according to Example 1. The following results were obtained:

| solvent | extracted PCP (mg/g) |
| --- | --- |
| water | 0.20 |
| 20% RAMEB | 0.24 |
| 20% HPBCD | 0.38 |
| 20% GCDPS | 0.29 |
| heptane | 0.05 |
| ethanol (96%) | 0.27 |

The dried soil samples were extracted by stirring for 15 min. magnetically with aqueous solutions of different cyclodextrin derivatives according to Example 1 and the composition of the extracts gained after filtration of the supernatant above the deposited soil left to sediment for 0.5 hours was measured by HPLC according to Example 4.

The following results were obtained:

| solvent | 1-methyl napthalene (μg/ml) | fluorene (μg/ml) | anthracene (μg/ml) | fluoranthene (μg/ml) | pyrene (μg/ml) |
| --- | --- | --- | --- | --- | --- |
| 100% (calculated composition of the extract) | 43.3 | 51.5 | 49.8 | 15.2 | 26.8 |
| 10% RAMEB | 23.3 | 49.0 | 42.5 | 11.0 | 12.2 |
| 10% HPBCD | 18.3 | 38.7 | 23.1 | 7.2 | 8.7 |
| 10% BCDPS | 21.3 | 47.9 | 35.4 | 12.0 | 18.2 |
| 10% AcBCDPS | 21.9 | 45.1 | 39.8 | 12.2 | 20.2 |
| 10% GCDPS | 14.4 | 30.2 | 14.4 | 6.8 | 11.1 |
| 10% AcGCDPS | 19.3 | 39.3 | 13.0 | 10.7 | 18.6 |

| solvent | 1-methyl naphthalene (μg/ml) | fluorene (μg/ml) | anthracene (μg/ml) | fluoranthene (μg/ml) | pyrene (μg/ml) | perylene (μg/ml) | Coronene (μg/ml) |
| --- | --- | --- | --- | --- | --- | --- | --- |
| 100% (calculated composition of the extract) | 56.5 | 59.9 | 54.8 | 14.3 | 26.3 | 8.4 | 7.1 |
| 5% RAMEB | 7.1 | 29.1 | 18.4 | 1.9 | 2.4 | <0.5 | 0.7 |
| 10% RAMEB | 10.0 | 44.1 | 27.6 | 7.3 | 13.2 | 0.6 | 0.9 |

-continued

| solvent | 1-methyl naphthalene (μg/ml) | fluorene (μg/ml) | anthracene (μg/ml) | fluoranthene (μg/ml) | pyrene (μg/ml) | perylene (μg/ml) | Coronene (μg/ml) |
|---|---|---|---|---|---|---|---|
| 15% RAMEB | 11.6 | 40.2 | 33.2 | 9.40 | 21.0 | 1.0 | 1.2 |
| 20% RAMEB | 12.1 | 50.2 | 32.0 | 10.0 | 23.4 | 1.5 | 1.3 |
| ethanol (96%) | 7.93 | 36.4 | 24.5 | 9.1 | 25.1 | 5.9 | 6.5 |

EXAMPLE 6

Extraction of Soil Contaminated With Polycyclic Aromatic Hydrocarbon (PAH) Mixture The soil sample of Example 1 contaminated with PAH mixture according to Example 5 was extracted as described in Example 5 with the only difference that the supernatants were filtered immediately after extraction.

The following results were obtained:

| solvent | 1-methyl naphthalene (μg/ml) | fluorene (μg/ml) | anthracene (μg/ml) | fluoranthene (μg/ml) | pyrene (μg/ml) | perylene (μg/ml) | Coronene (μg/ml) |
|---|---|---|---|---|---|---|---|
| 100% (calculated composition of the extract) | 56.5 | 59.9 | 54.8 | 14.3 | 26.3 | 8.4 | 7.1 |
| 10% RAMEB | 9.7 | 38.5 | 23.7 | 7.6 | 11.8 | <0.5 | 0.6 |
| 10% AcBCDPS | 7.7 | 26.6 | 19.7 | 6.6 | 11.8 | 1.2 | <0.5 |
| 10% AcGCD D.S. = 6.9 | 6.2 | 20.0 | 7.5 | 4.2 | 7.2 | <0.5 | <0.5 |
| 10% AcGCD D.S. = 11.5 | 8.0 | 25.0 | 9.9 | 6.1 | 12.8 | <0.5 | <0.5 |

EXAMPLE 7

Extraction of Clay Contaminated with Dichlorodiphenyltrichloroethane (DDT)

A clay contaminated with 0.27 mg/g DDT was extracted with aqueous solutions of different cyclodextrin derivatives according to Example 1. The following results were obtained:

| solvent | extracted DDT (mg/g) |
|---|---|
| water | 0 |
| 10% RAMEB | 0.11 |
| 10% HPBCD | 0.14 |
| 10% BCDPS | 0.14 |
| 10% GCDPS | 0.16 |
| ethanol (96%) | 0.22 |

While several embodiments of the present invention have been shown and described, it is to be understood that many changes and modifications may be made thereunto without departing from the spirit and scope of the invention as defined in the appended claims.

What is claimed is:

1. A method for the extraction of an organic pollutant from contaminated soil without further contaminating the soil with organic solvents comprising the step of
    mixing aqueous solutions of cyclodextrins, or cyclodextrin derivatives selected from the group consisting of alkyl, hydroxyalkyl and acyl substituted cyclodextrin derivatives or cross-linked cyclodextrin polymers or cross-linked cyclodextrin derivatives selected from the group consisting of alkyl, hydroxyalkyl and acyl substituted cyclodextrin derivatives, with the contaminated soil.

2. A method for enhancing bioremediation of soils contaminated with organic pollutants comprising
    mixing aqueous solutions of cyclodextrins or cyclodextrin derivatives selected from the group consisting of alkyl, hydroxyalkyl and acyl substituted cyclodextrin derivatives or cross-linked cyclodextrin polymers or cross-linked cyclodextrin derivatives selected from the group consisting of alkyl, hydroxyalkyl and acyl substituted cyclodextrin derivatives with the contaminated soils to increase the bioavailability of contaminants to microorganisms capable to degrade them.

3. A method for the extraction of an organic pollutant from contaminated soils, according to claim 1,
    wherein the soil is contaminated with an organic pollutant selected from the group consisting of hydrocarbons, polyaromatic hydrocarbons, and polychlorinated derivatives thereof.

4. The method for the extraction of an organic pollutant according to claim 1,
    wherein the soil is contaminated with an organic pollutant selected from the group consisting of phenol, polychlorinated phenols, aniline and polychlorinated aniline.

5. The method for the extraction of an organic pollutant according to claim 1,
    wherein the soil is contaminated with an organic pollutant selected from the group consisting of furane, polychlorinated furane, dioxine and polychlorinated dioxine.

6. The method for the extraction of an organic pollutant according to claim 1,
    wherein the soil is contaminated with an organic pollutant selected from the group consisting of biphenyl and polychlorinated biphenyl.

7. The method for the extraction of an organic pollutant according to claim 1,
    wherein the organic pollutant is an organic dye.

8. The method for the extraction of an organic pollutant according to claim 1,
    wherein the cyclodextrin is selected from the group consisting of α-cyclodextrin, β-cyclodextrin and γ-cyclodextrin.

9. The method for the extraction of an organic pollutant according to claim 1,
    wherein the cyclodextrin derivative is selected from the group consisting of an alkyl derivative, a hydroxyalkyl derivative and an acyl derivative of a cyclodextrin selected from the group consisting of α-cyclodextrin, β-cyclodextrin and γ-cyclodextrin.

10. The method for the extraction of an organic pollutant according to claim 9,
wherein said alkyl has 1 to 4 carbon atoms.

11. The method for the extraction of an organic pollutant according to claim 1,
wherein the cyclodextrin derivative is a polymer derivative of a cyclodextrin selected from the group consisting of α-cyclodextrin, β-cyclodextrin and γ-cyclodextrin, or an alkyl, hydroxyalkyl, acyl derivative of any of them.

12. The method for the extraction of an organic pollutant according to claim 11,
wherein the polymer derivative has an average molecular weight of 4000–6000.

* * * * *